United States Patent [19]

Blondel et al.

[11] Patent Number: 4,595,730
[45] Date of Patent: Jun. 17, 1986

[54] GRAFTED POLYMER FROM UNSATURATED POLYAMIDE HAVING SINGLE OLEFINIC DOUBLE BOND

[75] Inventors: Philippe Blondel; Camille Jungblut, both of Bernay, France

[73] Assignee: Atochem, Courbevoie, France

[21] Appl. No.: 666,895

[22] Filed: Oct. 31, 1984

[30] Foreign Application Priority Data

Nov. 4, 1983 [FR] France ................................ 83 17523

[51] Int. Cl.$^4$ .............................................. C08G 69/48
[52] U.S. Cl. ..................................... 525/178; 525/181; 525/426; 525/432; 528/310; 528/314; 528/315; 528/317; 528/318; 528/323; 528/335; 528/345
[58] Field of Search ............... 525/178, 181, 426, 432; 528/318, 314, 315, 317, 323, 310, 335, 345

[56] References Cited

U.S. PATENT DOCUMENTS

| | | | |
|---|---|---|---|
| 3,470,079 | 9/1969 | D'Alelio | 525/178 |
| 3,471,386 | 10/1969 | D'Alelio | 525/178 |
| 3,483,104 | 12/1969 | D'Alelio | 525/178 |
| 3,483,105 | 12/1969 | D'Alelio | 525/178 |
| 3,689,464 | 9/1972 | Holub et al. | 525/178 |
| 4,110,294 | 8/1978 | Pickering et al. | 525/426 |

*Primary Examiner*—Harold D. Anderson
*Attorney, Agent, or Firm*—Burgess, Ryan & Wayne

[57] ABSTRACT

Unsaturated polyamide polymers are provided which are comprised of a polyamide chain terminated at one end by a group containing at least one double bond. The polymers are particularly useful in the preparation of molded object coatings, water tight joints, grafting onto thermoplastic polymers or copolymers, and the like.

6 Claims, No Drawings

GRAFTED POLYMER FROM UNSATURATED POLYAMIDE HAVING SINGLE OLEFINIC DOUBLE BOND

FIELD OF THE INVENTION

This invention relates to the preparation of new ethylenically unsaturated polyamides, that for reasons of convenience we will call EUP. In one respect it specially refers to polyamide polymers having chains of limited length terminating at one of their ends by a group having at least one double bond. The invention also emcompasses a process for the production ofthe polymers and the uses thereof.

BACKGROUND OF INVENTION

It seems that the prior art was not interested in EUP including a unsaturated group at only one of its chain ends; but said products can be useful in the preparation of polymers having special properties convenient for certain particular uses. On the other hand, there are found in the technical literature references to the oligomers, polyesters and polyamides that include an unsaturated group at each one of the two ends of the chain (U.S. Pat. No. 3,483,104 and Japanese patent No. 51-125017); according to the prior art, they are most often prepared in solution, or using an unsaturated acid chloride or acid anhydride. This process is not economical and the oligomers of the prior art that have thus been prepared have low molecular weights that limit their applications.

This invention overcomes the above noted deficiency of the prior art; it makes possible the economical preparation, without a solvent and without using an acid chloride or anhydride, in a molten medium, of EUP that possess at only one end of their polymeric chain, an unsaturated group. The invention thus brings to the industry new products that are specially useful as thermosetting molding materials, additives for polyamide powders, impregnating resins, and the like. The polymers according to the invention are particularly suited for the preparation of interesting thermoplastic materials by grafting of said EUP on olefins or copolyolefins.

SUMMARY OF INVENTION

The new process according to the invention is characterized by heating, in the molten state and at a temperature above that at which the desired polycondensation product melts, a mixture comprising for the major part, a polyamide precursor monomer having at least 5 carbon atoms and a lesser part of at least one unsaturated compound containing an active group capable of reacting with one of the terminal groups, —NH₂ or COOH of the polyamide formed during the heating.

DETAILED DESCRIPTION OF THE INVENTION

The temperature employed in this process is above about 160° C., most often at least above 200° C., and in general from about 200° to 300° C., preferably from about 210° C. to about 280° C.

With regard to the unsaturated compound, it is especially recommended that a mono-unsaturated acid be used that plays the part of a chain regulator by blocking, from the beginning, a portion of the amine groups.

For carrying out the process, there is generally used 1 mole of an unsaturated compound containing an active group per 2 to 120 moles of polyamide monomer. Most often, this proportion is of 1 mole of the former per 4 to 50 moles of the latter.

The same as in the usual technique of the polyamides, the heated mixture is kept in an inert gas, especially nitrogen, atmosphere. The heating operation generally lasts from about 0.5 to 10 hours and most often from about 1 to 6 hours, preferably accompanied by stirring.

The polyamide precursor, that is, the monomer susceptible of undergoing polycondensation to ethylenically unsaturate polyamide or copolyamide, used in the process of the invention comprises one or more omega-aminoacids, lactams, salts of diacids with diamines, or mixtures of diacids with diamines. It is thus possible to use the compounds commonly used in the manufacture of polyamides as, for example, caprolactam, lauryllactam, aminocaproic acid, oenantholactam, heptanoic amino-7 acid, undecanoic amino-11 acid, dodecanoic amino-12 acid; mixtures or salts of diamines such as hexamethylene diamine, nonamethylene diamine, undecamethylene diamine, dodecamethylene diamine, metaxylylene diamine, bis-p.aminocyclohexyl methane, etc. with diacids such as terephthalic, isophthalic, adipic, azelaic, sebacic, dodecane, dicarboxylic, glutaric, etc. acids. Said amines and/or acids can of course carry substituents known in the art.

The choice of the unsaturated compound or compounds to be heated with the polyamide precursor is vast. This compound, which carries at least one double bond and can have several of them, is provided with an active group such as carboxyl, hydroxyl, amino, epoxy, carbalkoxy, and the like. The —NH₂ and —COOH groups are very advantageous and easily accessible.

The unsaturated compounds containing such groups can belong to different kinds of organic compounds. They can specially be of the type

  (1)

wherein the R¹, R² and R³ groups or atoms, similar or different, are: H, halogen, alkyl, aryl and in particular, phenyl, carboxyl, norbornyl, thienyl, pyrrolyl or furanyl, while the X active group can be:

—(CH₂)ₙCOOH with n=0 to 17;

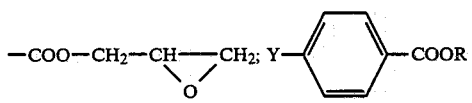

wherein Y is —COO, —CONH or it may not exist, R being H, alkyl or aryl

—CH₂OH ; —(CH₂)ₙ' with n'=0 to 18; —OH.

Thus, especially favorable examples of compounds according to formula (1) are: acids or esters of unsaturated acrylic, methacrylic, cinnamic, crotonic, citraconic, itaconic, vinylacetic, undecylenic, maleic, fummaric, 5-norbornene-2 acrylic, 3'-furanyl-2 acrylic, 3'pyrrolyl-2 acrylic, N-allyl aminobenzoic, N-acryloyl aminobenzoic, N-methacryloyl aminobenzoic, acryloyl oxybenzoic, methacryloyl oxybenzoic and other similar acids.

Another type of unsaturated compound adequate for the process according to the invention can be represented by the formula

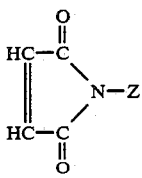
(2)

wherein Z is a —(CH$_2$)$_m$—COOR group or

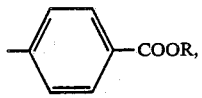

wherein R is an alkyl, an aryl or H and m is an integer from 1 to 17. Examples of such compounds are the N-maleimido acids and esters: hexanoic, p.benzoic, undecanoic, dodecanoic, and the like.

It is likewise possible to use as unsaturated compound a bicyclic or tricyclic body of the type

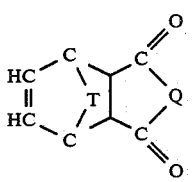
(3)

wherein T designates —CH$_2$—, but it may not exist in which case the compound comprises only two cycles. Q is —O—>N—C$_6$H$_5$—COOR or >N—(CH$_2$-)$_m$—COOR, R being an alkyl or aryl, H$_2$ and m=1 to 17. By way of non-limiting examples of said compounds, there can be cited the anhydrides and the imides derived of the anhydrides such as tetrahydrophthalic, p.N-maleimido benzoic, p[endo-cis-bicyclo(2,2,1)-5heptene-2,3 dicarboxylic].

Even though the invention is not limited by a mechanism of implied reactions, some of the features thereof can be illustrated by the following reaction diagrams.

By heating n moles of an omega aminoacid NH$_2$—A—COOH with 1 mole of an ethylenic acid RCH=CHR'COOH, there is obtained a polymer:

RCH=CHR'CONH—[—A—CONH ... CONH—A—]$_n$—COOH    I of which one chain end carries the unsaturated group RCH=CH, of the acid used.

If an NH$_2$—Q—NH$_2$ diamine is added, it gives, when heated with the other chain end of the polymer I, an amino ending:

... CONH——A$\}$CONH—Q—NH$_2$    II

An unexpected element in the process of the invention is the fact that the above reactions that lead to the polymers I or II can be carried out in only one time if there are mixed in advance n moles of omega aminoacid with 2 moles of the unsaturated acid and eventually 1 mole of diamine.

The invention can be similarly used by employing an unsaturated amine RCH=CHR'—NH$_2$ that leads to an unsaturated polymer at one of it ends:

NH$_2$—[-A—CONH ... CONH—A]n
CONH—R'CH=CHR    III

Although the ending of the chains illustrated by formulae I and III includes a single double bond, it can have several.

Thus, the EUP according to the invention that comprises a plyamide chain terminated by another group is characterized in that at least a double bond is in a group bonded to only one of the ends of the polyamidic chain.

The foregoing gives an idea of the structure of the unsaturated polymers according to the invention. It has already been noted above that these polymers include in general from about 2 to 120 amidic units originating from a polyamide monomer per 1 of an unsaturated compound. The medium molecular weights, in number, of these polymers are distributed between about 185 and 20,000 in the case of mono-unsaturation. The most common molecular weights are distributed between 500 and 10,000, approximately. The products appear most often in the form of white solids, more or less friable according to their molecular weight.

It is well understood that in these products, the polyamide chain can be formed by one copolymer and/or by polyamidic units carriers of substitutions.

Most of the polymers according to the invention melt between about 130° and 250° C. and mainly between about 150° and 200° C.

By cross linking the polymers according to the invention, it is possible to obtain masses useful for different uses such as molded objects, coatings, watertight joints, and the like. The cross linking can be effected under the action of generators of free radicals, especially of organic peroxides or diazoic peroxides, or even without a catalyst, at more elevated temperature of the order of from about 180° to 300° C. or more. On the other hand, the cross linking can be made by radiation, in particular ultraviolet; this manner of operation is specially adequate for the polymers according to the invention in which the unsaturated group belongs to the derivatives of acids such as cinnamic, acrylic, or methacrylic acid.

One particular application of the new polymers consists in affixing them, by a grafting reaction, to different thermoplastic polymers. Different new polymers are thus obtained. The reaction between the EUP according to the invention and the thermoplastic polymer or copolymer, eventually elastomeric, can be produced by the effect of different polymerization catalysts known already and/or under the effect of heat. Particularly convenient for this effect are the generators of free radicals such as organic peroxides or azoic compounds.

This grafting reaction is applied to different "trunk" polymers, especially to polymerization products obtained from a monomer such as ethylene, propylene; vinylic monomers such as vinyl acetate, vinyl chloride, styrene or butadiene, etc. Likewise adequate are the polymerization products of two or three monomers as, for example, ethylene/propylene, ethylene/vinyl acetate, ethylene/acrylate or glycidyl methacrylate, ethylene/vinyl acetate/vinyl chloride, ethylene/hydroxymethacrylate, ethylene/vinyl acetate/maleic anhydride, ethylene/vinyl acetate/acrylic acid, etc., especially poly (ethyleneco-vinyl acetate) or EVA containing from 14% to 28% vinyl acetate. There can also be used as "trunks", the polymerization products of two monomers on which there has been grafted a third monomer of the unsaturated alpha or beta acid type such as, for example, ethylene-vinyl acetate/maleic anhydride, ethylene-vinyl acetate/acrylic, or methacrylic, or maleic acid, ethylene-vinyl acetate/glycidyl methacrylate or acrylate, etc.

The trunk polymers used preferably have molecular weights between about 5,000 and 300,000. In the case of the poly(ethylene-co-vinyl acetate), it is convenient to choose preferably molecular weights between about 10,000 and 30,000.

The polymers used as "grafts" in this application can be the different polyamides, copolyamides, or terpolyamides described above. Especially adequate are the EUP prepared from polyamide 6, 11 or 12, on the copolyamides 6/6, 6/10, 6/11, 6/12, 11/12, or the terpolyamide 6/11/12.

The grafting reaction between the EUP and the trunk polymer is effected by heating a molten mixture of the two constituents in the desired proportions. The reaction preferably takes place between about 160° and 300° C., and mainly between about 190° and 250° C. Preferred are the temperatures near, or not much above, the melting temperature of the polymer. The grafting can be effected in an extruder or in a stirred metal reactor.

Other known means can be used such as the Brabender mixer. The grafting reaction can be followed in the vat of a Brabender plastograph by the evolution of the torsion couple; the latter always passes by a maximum when the graft rate is maximum.

The new thermoplastic compounds thus obtained can be used in numerous fields and especially as adhesives; as injectable or extrudable materials having good mechanical properties and interesting flexibility as additives or plasticigen for polyamides. When the gravimetric content of the EUP grafted on the trunk polymer is between about 1% and 30% and more precisely between about 1% and 10%, the thermoplastic product formed has improved adhesive properties. In particular, the grafted copolymers of which the trunk comprises poly(ethylene-covinyl acetate) and the grafts by polyamide 11 monoacrylate with molecular weights between about 255 and 2,000 and gravimetric contents between about 1% and 10%, have good adhesive properties in comparison with the poly(ethyleneco-vinyl acetate) alone. These resins are useful in the glueing of sheets, films or plates of numerous materials such as polymers, metals, glass, wood, fabrics, and the like.

When the gravimetric content of the EUP grafted on the trunk polymer is between about 70% and 95% and its average molecular weight is above about 8,000, the thermoplastic product has, compared to polyamide alone, mechanical properties and flexibilities that are of interest. These thermoplastic products can likewise be used as additives of the polyamides. They play the part of an emulsifier for they mix well with the polyamides by giving homogeneous products that can be easily injected or molded and present no delamination. This facility for homogenization is due to the polyamide grafts on the trunk polymer.

When a polyamide is mixed with the grafted compound and the content of trunk polymer is between about 2% and 50% and particularly between about 5% and 20% in the case of the poly(ethylene-co-vinyl acetate) to 28% vinyl acetate, the thermoplastic products have improved properties of flexibility and shock resistance even at low termperature.

When the polycondensation of the amino 11-undecanoic acid is effected in the presence of the grafted copolymer and the content of trunk polymer is between about 2% and 50%, and particularly between about 5% and 20% in the case of the poly(ethylene-co-vinyl acetate), to 28% vinyl acetate, the thermoplastic products also have improved properties of flexibility and shock resistance at low temperature. The polyamide graft, which carries at its end an amine or carboxylic functional group, has a double property; on the one hand, it serves as chain regulator by limiting the length of the polyamide chains that adhere to the end groups $-NH_2$ or $-COOH$ of the grafted copolymer, on the other, it plays the part of a compatibility agent for the blends of polyamide with EUP grafted polyolefins or other non-adhered polyamide chains. The products obtained are homogeneous and present no delamination phenomenon during their subsequent transformations (injection, molding). Such a product is obtained in Example 11 hereinbelow.

One advantage of the polymers according to the invention in comparison to the plastified polymers is that there are no volatile products that escape during the different transformations, no odor and no exudation in the long run.

The invention is illustrated by the following non-limiting examples.

EXAMPLE 1

Preparation of a mono-unsaturated polymer having a base of polyamide 11.

The work is carried out in a metal reactor having a capacity of 2 liters and provided with three tubes; a gas inlet, communication with a distillation system comprising a condenser connected to a distillate receiver and a stirrer with an anchor.

There are introduced in the reactor:

600g, that is, 2.985 moles amino-11 undecanoic acid $NH_2-(CH_2)_{10}-COOH$ and 51.34 g, that is, 0.597 mole crotonic acid, $CH_3CH=CH-COOH$ which corresponds to 1 mole unsaturated acid per 5 moles omega aminoacid.

The reactor is cleaned with nitrogen, then heated to 210° C. in 40 minutes, all the gate valves closed; the pressure reaches 5 bars.

The content of the reactor is then decompressed, and heating at 210° C. is continued for 4 hours with a stirring of 60 revolutions per minute, while allowing to pass a nitrogen current of 30 l/h. A vacuum of 0.3 to 0.5 mbar is then applied for 1 hour to terminate the reaction.

The polymer is withdrawn from the reactor in a water vat to prevent its being oxidized in the air; it is separated and oven dried under vacuum at 50° C. for 14 hours. The average molecular weight ($\overline{Mn}$) is determined, on the one hand, by dosage of the terminal $-COOH$ [designated $\overline{Mn}$ (COOH)] according to the method of J. E. WALTZ and G. B. TAYLOR (Anal. Chem. 19, 7, 1947) and on the other, by viscosimetry [$\overline{Mn}(\eta)$]. The melting temperature is determined by the DSC method. There is thus found:

$\overline{Mn}$ (COOH) = 1180
$\overline{Mn}$ ($\eta$) = 1210
Tf = 166° C.

EXAMPLE 2

Different mono-unsaturated polymers.

The operations of Example 1 are repeated with successively 7 organic compounds including at one end a carboxylic group and at the other an unsaturated group; always with 1 mole of non-saturated acid per 5 moles amino-11 undecanoic acid. Table 1 shows the values of the molecular weights and of the melting temperature of the polymers thus synthesized.

TABLE 1

| Unsaturated compound | Tf(°C.) | $\overline{Mn}$(COOH) | $\overline{Mn}(\eta)$ |
|---|---|---|---|
| Cinnamic acid | 171 | 1130 | 1240 |
| Crotonic acid | 166 | 1180 | 1210 |
| Methacrylic acid | 166 | 1000 | 1220 |
| Undecylenic acid | 165.5 | 1010 | 1080 |
| Tetrahydrophthalic anhydride | 166 | 1150 | 1200 |
| Endo-cis-bicyclo[2,2,1] hept-5-ene-2,3-dicarboxylic or nadic anhydride | 157 | 940 | 1000 |

The melting temperatures are determined by the DSC method.

EXAMPLE 3

Mono-unsaturated polymer of weak unsaturated.

Example 1 is repeated with 600 g (2,985 moles) of amino-11 undecanoic acid and only 5.5 g (0.064 mole) crotonic acid that is, 1 mole of the latter for 46.6 moles of aminoacid. A hard white solid is obtained. The intrinsic viscosity in the m.cresol at 25° C. is 0.72. $\overline{Mn}(\eta)=8600$.

EXAMPLE 4

Mono-unsaturated polymer from lauryl lactam.

There are introduced in the reactor of Example 1 lauryl-lactam, 492.5 g (2.48 moles), crotonic acid, 48 g (0.56 mole) that is, 1 mole of this acid per 4.43 moles of lactam, and water, 50 g (=2.8 mole), that is, 10% by weight. After having cleaned the reactor with nitrogen, all the gate valves are closed. The reactor is then heated to 270° C. for 2 hours under stirring and the pressure reaches 27 bars. The crotonic acid plays here a double part; it catalyzes the beginning of the lactamic cycle and on the other hand serves as a chain regulator. The reactor is then cut off for 45 minutes; then the reaction is continued for 2 more hours under a nitrogen current. $\overline{Mn}$(COOH)=1120.

EXAMPLE 5

Following the same procedure as above, 904 g of ε-caprolactam are polymerized in the presence of 72 g acrylic acid at 200° C. for 10 hours. The oligomer obtained has an average molecular weight of 900 and 75% of the chains contain the terminal acrylate group.

Use of the polymers according to Examples 1 to 5 in the preparation of new thermoplastic products by grafting.

The following materials are homogenized by rotation in a drum: poly(ethylene-co-vinyl acetate) with 28% vinyl acetate;
  ("Melt-Index"=5 to 7 at 190° C.) ... 9600 g
  monoacrylate polymer of the polyamide 11 containing 5 patterns of aminoacid per acrylic group of an average molecular weight of 1500 ... 400 g
  ditertiarybutyl peroxide ... 200 ppm
The constituents are mixed in a double-stage extruder according to the following working conditions:

Speed of rotation (t/mn):
  1st thread L/D=18 ... 100
  2nd thread L/D=13 ... 115
Temperature shown (° C.):
  Inlet ... 50
  1st stage ... 190
  2nd stage ... 190
  exit ... 220
Yield (kg/h): ... 36

The product exits in the form of a supple, easily granulated reed that is soluble in chloroform, benzene, toluene, or trichloroethylene.

EXAMPLE 7

In a rotary drum, homogenization is carried out in the following proportions:
  polyethylene-co-vinyl acetate ... 96 parts by weight
  crotonate polymer of the polyamide 11 with 7 aminoacid patterns per crotonic group, having an average molecular weight of about 1100 ... 4 parts by weight
  ditertiarybutyl peroxide ... 200 ppm The mixture is extruded in a single screw extruder according to the following working conditions:
Speed of rotation (t/mn): ... 150
Temperature (° C.):
  Inlet ... 200
  middle ... 185
  exit ... 220
Yield (kg/h): ... 10

The same operations have been effected with each one of the following six polymers having a base of polyamide-11 (likewise 4 parts per 96 EVA):

| | |
|---|---|
| mono-acrylate | $\overline{Mn}$ = 1500 |
| mono-methacrylate | $\overline{Mn}$ = 1000 |
| mono-crotonate | $\overline{Mn}$ = 1120 |
| mono-undecylenate | $\overline{Mn}$ = 1010 |
| mono-cinnamate | $\overline{Mn}$ = 1130 |
| mono-nadate | $\overline{Mn}$ = 940 |
| and polyamide 6 | |
| mono-acrylate | $\overline{Mn}$ = 900 |

They are all flexible products that can be granulated.

EXAMPLE 8

In a 1-liter glass reactor the lid of which includes 3 exits, one inlet and a gas exit, and stirring, there are introduced:
  192 g poly(ethylene-co-vinyl acetate)
  8 g polyamide 11 monoacrylatepolymer ($\overline{Mn}$=1500)
  0.4 g dicumylperoxide.

After having been cleansed with nitrogen, the reactor is placed in an oil bath at 200° C. and it is stirred under nitrogen for 20 minutes. After having been cooled with nitrogen, the product is ground.

EXAMPLE 9

A thermal grafting without peroxide of the monocrotonic polymer of the PA11 ($\overline{Mn}$=8600) of Example 3 on an ethylenevinyl acetate copolymeric skeleton is carried out in a metal reactor stirred by simple heating at 220° C. for 6 hours under nitrogen. There are thus prepared three grafted copolymers having respectively 80%, 90% and 95% of polymer. Their properties are given below in Example 15.

Mixture of the new thermoplastic product with a polyamide in extruder

EXAMPLE 10

Homogenization is carried out in a vat for 1000 g of the compound of Example 6 with 9000 g of an industrial polyamide 11 of a molecular weight of $\overline{Mn}=16000$ sold on the market under the name of Rilsan BMNO by ATOCHEM Company. The combination is extruded by a doublethread extruder following the conditions of Example 6. There is obtained a whiteproduct in easily granulated reeds.

EXAMPLE 11

In a stirred metal reactor containing 100 g of the compound prepared in Example 6 and 900 g of amino-11 undecanoic acid, the polycondensation is effected according to the conditions of Example 9. The product obtained is white and homogeneous.

EXAMPLE 12

Measure of adhesiveness

The peeling strengths are evaluated according to the ASTM D 1876 standard. The glueing is effected on aluminum foils (e=100 micra) 2 cm wide and the sealing is effected for 5 minutes under 4 bars generally at 200° C. The peeling strength is measured by means of a dynamometer having a lifting speed of 50 mm/mn, stretching in T.

The peeling strength of the product of Example 6 is compared in the table hereinbelow to that of the poly-(ethylene-co-vinyl acetate) alone or containing 0.35% maleic anhydride. The peeling strength is improved by a factor of 13 at temperatures between 20° C. and 60° C.

| Adhesive polymers | Stripping force (daN/cm) | |
|---|---|---|
|  | 20° C. | 60° C. |
| Ethylene-vinyl acetate copolymer (72%/28%) | 0.25 | 0.22 |
| Ethylene-vinyl acetate maleic anhydride terpolymer (71.65%/28%/0.35%) | 1.79 | 1.83 |
| Compound product of Example 6 | 3.38 | 2.94 |

EXAMPLE 13

There have been tested the series of the new thermoplastic products prepared according to Example 7 and obtained from polymers derived from the polyamide 11 and from unsaturated acids other than acrylic acid. The comparison with the non-grafted poly (ethylene-co-vinyl acetate) (EVA) is contained in the table herebelow. In all cases, the peeling strength has been very substantially improved in comparison to the control.

| Aluminum/aluminum substrate | Peeling strength (daN/cm) at 20° C. |
|---|---|
| PA 11 acrylate | 3.38 |
| PA 11 crotonate | 1.75 |
| PA 11 cinnamate | 1.25 |
| PA 11 methacrylate | 2.70 |
| PA 11 undecylenate | 1.90 |
| EVA alone (control) | 0.25 |

EXAMPLE 14

The compound of example 6 having been used for gluing aluminum on different substrates such as glass, steel, wood or fabrics, plastics materials, the peeling strength, of said combinations have been measured.

| Substrate | Temperature | Pressure (bars) | Time (s) | Peeling strength at 20° C. (daN/cm) |
|---|---|---|---|---|
| Alu/Steel | 200 | 4 | 300 | 4.25 |
| Alu/Wood | 200 | 4 | 60 | 3.25 |
| Alu/Glass | 180 | 2 | 300 | 5.75 |
| Alu/Glass | 180 | 2 | 60 | 3.13 |
| Alu/Pa 11 | 120 | 4 | 300 | 0.15 |
| Alu/Pa 6 | 120 | 4 | 300 | 2.25 |
| Alu/Pa 12 | 120 | 4 | 300 | 0.90 |
| Alu/PE | 120 | 4 | 300 | 0.25 |
| Alu/PEbd | 90 | 4 | 120 | 0.15 |
| Alu/PVD rigid | 90 | 4 | 120 | 0.88 |
| Alu/PVC flexible | 90 | 4 | 120 | 0.88 |
| Alu/Pb | 90 | 4 | 120 | 1.38 |
| Alu/Fabric PA | 160 | 4 | 30 | 1.13 |
| Alu/Fabric cotton | 160 | 4 | 30 | 1.81 |
| Fabric PA/PA | 160 | 4 | 30 | 0.85 |
| Fabric cotton/cotton | 160 | 4 | 30 | 1.88 |

EXAMPLES 15 to 18

Mechanical properties of some of the copolymers grafted according to the invention have been determined by standardized methods. They are gathered in the table herebelow. In said table the following abbreviations have been used.

HDT - heat deflection temperature under 4.6 bars (ASTM D 648)

TS - constraint at break in $daN/mm^{-2}$ (ASTM D 638)

EL- elongation at break, in per cent (ASTM D 638)

MOD - modulus of rigidity in torsion in $daN/cm^{-2}$ (ASTM D 1043)
(according to CLASH and BERG)

Shock resistance - Iso 979
  SE - test with shock without notch (+20° C. and −40° C.)
  AE - test with shock with notch (+20° C. and −40° C.)

MI - Melting index ("melt index")

NB means "not broken".

See the table on the following page.

These results show that the flexibility of the polyamide is improved by the grafting of the polymers according to the invention. It is the same in the shock resistance with notch.

| Ex. No. | POLYMER | HDT | TS | EL | MOD | SE +20 | SE −40 | AE +20 | AE −40 |
|---|---|---|---|---|---|---|---|---|---|
| 15 | From example 9 95% PA 11/5% EVA | 102 | 5,3 | 345 | 2640 | NB | NB | NB | 7 |

-continued

| Ex. No. | POLYMER | HDT | TS | EL | MOD | SE +20 | SE −40 | AE +20 | AE −40 | |
|---|---|---|---|---|---|---|---|---|---|---|
| | 90% PA 11/10% EVA | 94 | 5,2 | 362 | 2495 | NB | NB | NB | 4,7 | |
| | 80% PA 11/20% EVA | 78 | 4,4 | 380 | 1840 | NB | NB | NB | 2,9 | |
| 16 | From example 11 percent 11 - amino- undecanoic acid | | | | | | | | | MI: |
| | 95% | 107 | 5,6 | 319 | 3260 | NB | NB | NB | 8,4 | 242 |
| | 90% | 90 | 5,8 | 343 | 3050 | NB | NB | NB | 8,4 | 285 |
| | 85% | 76 | 5,3 | 380 | 2750 | NB | NB | NB | 10,3 | 342 |
| | 80% | 73 | 4,8 | 388 | 2350 | NB | NB | NB | 6 | 1730 |
| 17 | From example 10: | | | | | | | | | |
| | 90% BMNO (Mn = 16 000) | 74 | 4,9 | 266 | 2370 | NB | NB | NB | 8,1 | — |
| 18 | Control: BMNO alone (Mn = 16 000) | 125 | 5,7 | 350 | 3300 | NB | NB | NB | 10 | — |

We claim:

1. A low temperature, thermoplastic, flexible, shock resistant grafted polymer obtained by grafting a polymer having a single olefinic double bond and comprising a polyamide chain containing from 2 to about 120 monomeric units terminated at only one end by a group having said olefinic double bond to at least one polymer selected from the group consisting of thermoplastic polymers, thermoplastic copolymers, elastomeric polymers and elastomeric copolymers, said grafting effected through said olefinic double bond.

2. The grafted polymer of claim 1 formed by heating a molten mixture of said polymer containing said polyamide chain with at least one polymer selected from the group consisting of olefinic polymers, vinylic polymers, amide polymers, and dienic polymers thereof at a temperature of from about 190° C. to 250° C., and having a molecular weight of from about 5,000 to 300,000 as determined by dosage of the terminal —COOH according to the method set forth in Anal. Chem. 19, 7,(1947).

3. A polymer of claim 2, wherein the molten mixture contains a free radical catalyst.

4. A polymer mixture comprising a polyamide and a polymer of claim 2.

5. A polymer mixture comprising a polyamide and a polymer of claim 3.

6. The grafted polymer of claim 1, wherein said polymer containing said polyamide chain has a molecular weight of from about 185 to 20,000, as determined by dosage of the terminal —COOH according to the method set forth in Anal. Chem. 19, 7 (1947).

* * * * *